(12) United States Patent
Wang

(10) Patent No.: US 12,101,792 B2
(45) Date of Patent: Sep. 24, 2024

(54) COMMUNICATION METHOD AND APPARATUS, COMPUTER-READABLE MEDIUM, AND ELECTRONIC DEVICE

(71) Applicant: TENCENT TECHNOLOGY (SHENZHEN) COMPANY LIMITED, Guangdong (CN)

(72) Inventor: Tao Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 443 days.

(21) Appl. No.: 17/463,646

(22) Filed: Sep. 1, 2021

(65) Prior Publication Data

US 2021/0400657 A1   Dec. 23, 2021

Related U.S. Application Data

(63) Continuation of application No. PCT/CN2020/094485, filed on Jun. 5, 2020.

(30) Foreign Application Priority Data

Jun. 17, 2019 (CN) .......................... 201910523813.1

(51) Int. Cl.
*H04W 72/04* (2023.01)
*H04W 36/00* (2009.01)
(Continued)

(52) U.S. Cl.
CPC ....... *H04W 72/51* (2023.01); *H04W 36/0072* (2013.01); *H04W 72/02* (2013.01);
(Continued)

(58) Field of Classification Search
CPC .............................. H04W 36/08; H04W 72/02
See application file for complete search history.

(56) References Cited

U.S. PATENT DOCUMENTS

| 5,327,577 A | 7/1994 | Uddenfeldt |
| 2005/0124345 A1 | 6/2005 | Laraoia et al. |

(Continued)

FOREIGN PATENT DOCUMENTS

| CN | 108632928 A | 10/2018 |
| CN | 109314897 A | 2/2019 |

(Continued)

OTHER PUBLICATIONS

Communication dated Oct. 11, 2022 from the Japanese Patent Office in Application No. 2021-553354.

(Continued)

*Primary Examiner* — Fahmida S Chowdhury
(74) *Attorney, Agent, or Firm* — Sughrue Mion, PLLC

(57) ABSTRACT

Embodiments of the disclosure provide a communication method and a communication apparatus, a computer-readable medium, and an electronic device. The communication method includes: performing, by a core network entity of a first network, communication negotiation with a core network entity of a second network to obtain a communication resource pool allocated by the core network entity of the second network to a terminal device in the first network, the first network sharing an access network with the second network; and configuring the communication resource pool for the terminal device to enable the terminal device to use a communication resource in the communication resource pool for communication after moving to the second network.

6 Claims, 7 Drawing Sheets

(51) Int. Cl.
    *H04W 72/02*    (2009.01)
    *H04W 72/1263*  (2023.01)
    *H04W 72/51*    (2023.01)
    *H04W 36/08*        (2009.01)
    *H04W 36/14*        (2009.01)

(52) U.S. Cl.
    CPC .... *H04W 72/1263* (2013.01); *H04W 36/0022* (2013.01); *H04W 36/083* (2023.05); *H04W 36/1443* (2023.05)

(56) References Cited

U.S. PATENT DOCUMENTS

| | | |
|---|---|---|
| 2009/0044191 A1 | 2/2009 | Chai et al. |
| 2012/0028640 A1* | 2/2012 | Guo .................... H04W 28/088 455/435.1 |
| 2014/0010202 A1 | 1/2014 | Maia Neves et al. |
| 2014/0220981 A1 | 8/2014 | Jheng et al. |
| 2015/0139056 A1 | 5/2015 | Wang et al. |
| 2018/0376384 A1* | 12/2018 | Youn ...................... H04W 36/14 |
| 2019/0261264 A1* | 8/2019 | Lou ........................ H04W 48/18 |
| 2019/0268777 A1* | 8/2019 | Simon ................ H04N 21/6131 |
| 2019/0268820 A1* | 8/2019 | Yang ................... H04L 41/0816 |
| 2019/0281641 A1* | 9/2019 | Cheng .................... H04L 41/08 |
| 2019/0289650 A1* | 9/2019 | Yoo ........................ H04W 48/18 |
| 2019/0297660 A1* | 9/2019 | Shaikh .................. H04W 76/12 |
| 2020/0037386 A1* | 1/2020 | Park ...................... H04W 76/25 |
| 2020/0196296 A1* | 6/2020 | Byun ...................... H04W 4/44 |
| 2020/0260240 A1* | 8/2020 | Lee ......................... H04W 4/02 |
| 2020/0280836 A1* | 9/2020 | Velev .................... H04W 76/20 |
| 2021/0195471 A1* | 6/2021 | Aramoto ......... H04W 36/00224 |
| 2021/0250820 A1* | 8/2021 | Rugeland ............. H04W 36/14 |
| 2022/0150756 A1* | 5/2022 | Garcia .............. H04W 28/0958 |

FOREIGN PATENT DOCUMENTS

| | | |
|---|---|---|
| CN | 109862622 A | 6/2019 |
| CN | 110199533 A | 9/2019 |
| CN | 110351804 A | 10/2019 |
| EP | 1603355 A2 | 12/2005 |
| EP | 1777982 A2 | 4/2007 |
| EP | 2541985 A1 | 1/2013 |
| EP | 3706466 A1 | 9/2020 |
| JP | 2017-520208 A | 7/2017 |
| KR | 10-2011-0031229 A | 3/2011 |
| KR | 10-2016-0092389 A | 8/2016 |
| WO | 2014/161161 A1 | 10/2014 |
| WO | 2015/182111 A1 | 12/2015 |
| WO | 2015/196325 A1 | 12/2015 |
| WO | 2019/095206 A1 | 5/2019 |

OTHER PUBLICATIONS

Extended European Search Report dated Nov. 8, 2022 in Application No. 20826463.0.
Communication dated Dec. 6, 2023, issued in Korean Application No. 10-2021-7029383.
Translation of the Written Opinion dated Sep. 7, 2020, issued in International Application No. PCT/CN2020/094485.
Chinese Office Action for Chinese Patent Application 201910523813.1 dated Mar. 26, 2021, 7 pages.
International Search Report for PCT/CN2020/094485 dated Sep. 7, 2020.
Written Opinion for PCT/CN2020/094485 dated Sep. 7, 2020.
Communication dated Feb. 15, 2023 from the Korean Patent Office in Application No. 10-2021-7029383.

\* cited by examiner

COMMUNICATION METHOD AND APPARATUS, COMPUTER-READABLE MEDIUM, AND ELECTRONIC DEVICE

CROSS-REFERENCE TO RELATED APPLICATION(S)

This application is a bypass continuation application of International Application No. PCT/CN2020/094485, filed on Jun. 5, 2020, which claims priority to Chinese Patent Application No. 201910523813.1, filed with the National Intellectual Property Administration, PRC on Jun. 17, 2019, the disclosures of which are herein incorporated by reference in their entireties.

FIELD

The disclosure relates to the field of computer and communication technologies, and specifically, to a communication technology.

BACKGROUND

Methods for obtaining a communication resource by a terminal device mainly include a scheduling mode and a resource pool mode. If the terminal device remains within the coverage of one network, a communication resource can be obtained conveniently within the range of the network. However, if the terminal device moves between the coverage of different networks, for example, a vehicle to everything (V2X) terminal moves from the coverage of a 4G network to the coverage of a 5G network, it becomes difficult to ensure the communication continuity of the terminal device.

SUMMARY

Embodiments of the disclosure provide a communication method and apparatus, a computer-readable medium, and an electronic device, to ensure the communication continuity to a certain degree during network handover of a terminal device, which is conducive to improving the communication efficiency of the terminal device.

Other features and advantages of the disclosure become obvious through the following detailed descriptions, or may be partially learned through the practice of the disclosure.

According to an aspect of example embodiments of the disclosure, a communication method is provided, performed by a core network entity of a first network, the method including:

performing communication negotiation with a core network entity of a second network to obtain a communication resource pool allocated by the core network entity of the second network to a terminal device in the first network, the first network sharing an access network with the second network; and configuring the communication resource pool for the terminal device to enable the terminal device to use a communication resource in the communication resource pool for communication after moving to the second network.

According to an aspect of example embodiments of the disclosure, a communication method is provided, performed by an access network entity of a third network, the method including:

determining whether inter-radio access technology-based communication resource control is allowed between the access network entity of the third network and an access network entity of a fourth network, access networks of the third network and the fourth network being different; and performing, based on a determination that the inter-radio access technology-based communication resource control is allowed between the access network entity of the third network and the access network entity of the fourth network, communication resource scheduling for a terminal device by using the access network entity of the third network as the terminal device moves from the third network to the fourth network.

According to an aspect of example embodiments of the disclosure, a communication method is provided, performed by a terminal device, the method including:

obtaining a communication capability of the terminal device; and based on the communication capability indicating that the terminal device supports only a network mode of a third network, performing communication by using a communication resource pool allocated by a network entity of the third network as the terminal device moves from the third network to a fourth network, the communication resource pool allocated by the network entity of the third network being different from a communication resource pool allocated by a network entity of the fourth network; and based on the communication capability indicating that the terminal device supports network modes of the third network and the fourth network, maintaining communication resource configuration information of the third network as the terminal device moves from the third network to the fourth network, until a communication resource allocated by the network entity of the fourth network is obtained.

According to an aspect of example embodiments of the disclosure, a communication method is provided, performed by an access network entity, the method including:

detecting, as a terminal device is handed over from a first network to a second network, whether an access network entity to which the terminal device is connected changes, the first network sharing an access network with the second network;

based on a determination that the access network entity to which the terminal device is connected does not change, continuing to perform communication resource scheduling for the terminal device by using the access network entity; and based on a determination that the access network entity to which the terminal device is connected changes, transmitting resource configuration information to a target access network entity to which the terminal device is connected in the second network by using a source access network entity to which the terminal device is connected in the first network, to enable the target access network entity to perform communication resource scheduling for the terminal device according to the resource configuration information, the source access network entity being an access network entity to which the terminal device is connected in the first network, the target access network entity being an access network entity to which the terminal device is connected in the second network.

According to an aspect of example embodiments of the disclosure, a communication apparatus is provided, including:

at least one memory configured to store program code; and at least one processor configured to read the program code and operate as instructed by the program code, the program code comprising:

communication negotiation code configured to cause at least one of the at least one processor to perform communication negotiation with a core network entity of a second network to obtain a communication resource pool allocated by the core network entity of the second network to a terminal device in a first network, the first network sharing an access network with the second network; and configuration code configured to cause at least one of the at least one processor to configure the communication resource pool for the terminal device to enable the terminal device to use a communication resource in the communication resource pool for communication after moving to the second network.

According to an aspect of example embodiments of the disclosure, a communication apparatus is provided, including:

at least one memory configured to store program code; and at least one processor configured to read the program code and operate as instructed by the program code, the program code comprising:

determining code configured to cause at least one of the at least one processor to determine whether inter-radio access technology-based communication resource control is allowed between an access network entity of a third network and an access network entity of a fourth network, access networks of the third network and the fourth network being different; and scheduling code configured to cause at least one of the at least one processor to, based on a determination that the inter-radio access technology-based communication resource control is allowed between the access network entity of the third network and the access network entity of the fourth network, perform communication resource scheduling for a terminal device by using the access network entity of the third network as the terminal device moves from the third network to the fourth network.

According to an aspect of example embodiments of the disclosure, a communication apparatus is provided, including:

at least one memory configured to store program code; and at least one processor configured to read the program code and operate as instructed by the program code, the program code comprising:

obtaining code configured to cause at least one of the at least one processor to obtain a communication capability of a terminal device;

processing code configured to cause at least one of the at least one processor to, based on the communication capability indicating that the terminal device supports only a network mode of a third network, perform communication by using a communication resource pool allocated by a network entity of the third network as the terminal device moves from the third network to a fourth network, the communication resource pool allocated by the network entity of the third network being different from a communication resource pool allocated by a network entity of the fourth network; and based on the communication capability indicating that the terminal device supports network modes of the third network and the fourth network, maintain communication resource configuration information of the third network as the terminal device moves from the third network to the fourth network, until a communication resource allocated by the network entity of the fourth network is obtained.

According to an aspect of example embodiments of the disclosure, a communication apparatus is provided, including:

detection code configured to cause at least one of the at least one processor to detect, as a terminal device is handed over from a first network to a second network, whether an access network entity to which the terminal device is connected changes, the first network sharing an access network with the second network; and scheduling code configured to cause at least one of the at least one processor to, based on a detection that the access network entity to which the terminal device is connected does not change, continue to perform communication resource scheduling for the terminal device by using the access network entity; and based on a detection that the access network entity to which the terminal device is connected changes, transmit resource configuration information to a target access network entity to which the terminal device is connected by using a source access network entity to which the terminal device is connected, to enable the target access network entity to perform communication resource scheduling for the terminal device according to the resource configuration information, the source access network entity being an access network entity to which the terminal device is connected in the first network, the target access network entity being an access network entity to which the terminal device is connected in the second network.

According to an aspect of example embodiments of the disclosure, a computer-readable medium is provided, storing a computer program, the computer program, when executed by a processor, implementing the communication method according to the foregoing embodiments.

According to an aspect of example embodiments of the disclosure, an electronic device is provided, including: one or more processors; and a storage apparatus, configured to store one or more programs, the one or more programs, when executed by the one or more processors, causing the one or more processors to implement the communication method according to the foregoing embodiments.

According to an aspect of example embodiments of the disclosure, a computer program product is further provided, including instructions, the instructions, when run on a computer, causing the computer to perform the communication method according to the foregoing embodiments.

BRIEF DESCRIPTION OF THE DRAWINGS

Accompanying drawings herein are incorporated into this specification and constitute a part of this specification, show example embodiments that conform to the disclosure, and are used for describing a principle of the disclosure together with this specification. The accompanying drawings described below are merely some embodiments of the disclosure, and a person of ordinary skill in the art may further obtain other accompanying drawings according to the accompanying drawings without creative efforts.

DETAILED DESCRIPTION

Hereinafter, example embodiments are described more comprehensively with reference to the accompanying drawings. However, the example embodiments may be implemented in a plurality of forms, and it is not to be understood as being limited to the examples described herein. Conversely, the implementations are provided to make the disclosure more comprehensive and complete, and comprehensively convey the idea of the examples of the implementations to a person skilled in the art.

In addition, the described characteristics, structures, or features may be combined in one or more embodiments in any appropriate manner. In the following descriptions, specific details are provided to give a comprehensive understanding of the embodiments of the disclosure. However, a person of ordinary skill in the art is to be aware that, the technical solutions in the disclosure may be implemented without one or more of the particular details, or another method, unit, apparatus, or step may be used. In other cases, well-known methods, apparatuses, implementations, or operations are not shown or described in detail, to avoid obscuring the aspects of the disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely for illustrative purposes and do not necessarily include all of the content and operations/steps, nor are the flowcharts necessarily performed in the order described. For example, some operations/steps may be further divided, while some operations/steps may be combined or partially combined or omitted. Therefore, an actual execution order may change according to an actual case.

Figure 1:
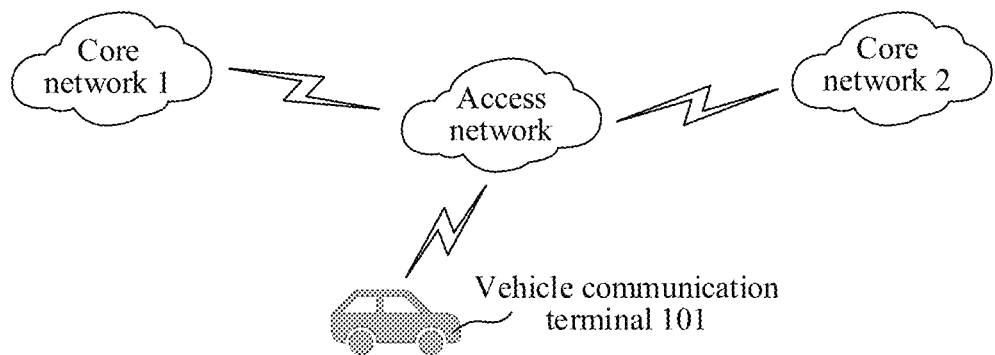
FIG. 1 is a schematic diagram of an example system architecture to which a communication method according to an example embodiment of the disclosure may be applied.

FIG. 1 is a schematic diagram of an example of a system architecture. The technical solutions provided by the embodiments of the disclosure may be applied to the system architecture of FIG. 1.

As shown in FIG. 1, the system architecture may include a vehicle communication terminal 101 and two networks that share an access network. Core networks of the two networks are respectively a core network 1 and a core network 2.

It is to be understood that, the quantity of the vehicle communication terminals 101 and the quantity of the networks shown in FIG. 1 are merely an example. The system architecture may include any quantity of vehicle communication terminals 101 and any quantity of networks depending on an embodiment.

In an embodiment of the disclosure, when the vehicle communication terminal 101 is within the coverage of the core network 1 (that is, interacts with the core network 1 by using the access network), a core network entity in the core network 1 may perform communication negotiation with a core network entity in the core network 2, to obtain a communication resource pool allocated by the core network entity in the core network 2 to the vehicle communication terminal 101. Next, the core network entity in the core network 1 may configure, for the vehicle communication terminal 101 by using the access network, the communication resource pool allocated by the core network entity in the core network 2, so that the vehicle communication terminal 101 uses a communication resource in the communication resource pool for communication after moving to the coverage of the core network 2. It can be learned that, based on the system architecture shown in FIG. 1, the vehicle communication terminal 101 may perform communication by using a resource pool mode.

In an embodiment of the disclosure, based on the system architecture shown in FIG. 1, the vehicle communication terminal 101 may further obtain a communication resource based on a scheduling mode. For example, the access network may detect, as the vehicle communication terminal 101 moves from the coverage of the core network 1 to the coverage of the core network 2, whether an access network entity to which the vehicle communication terminal 101 is connected changes. If the access network entity to which the vehicle communication terminal 101 is connected does not change, communication resource scheduling continues to be performed for the vehicle communication terminal 101 by using the access network entity to which the vehicle communication terminal 101 is connected. If the access network entity to which the vehicle communication terminal 101 is connected changes, resource configuration information is transmitted to a target access network entity to which the vehicle communication terminal 101 is connected (that is, an access network entity to which the vehicle communication terminal 101 is connected after the vehicle communication terminal moves to the coverage of the core network 2) by using a source access network entity to which the vehicle communication terminal 101 is connected (that is, an access network entity to which the vehicle communication terminal 101 is connected when the vehicle communication terminal is within the coverage of the core network 1), so as to enable the target access network entity to perform the communication resource scheduling for the vehicle communication terminal 101 according to the resource configuration information. It can be learned that, based on the system architecture shown in FIG. 1, the vehicle communication terminal 101 may alternatively perform communication by using a scheduling mode.

The access network in the system architecture shown in FIG. 1 may be an evolved universal terrestrial radio access (E-UTRA) network, and the core network 1 and the core network 2 may be an evolved packet core (EPC) network and a 5G core (5GC) network. For example, if the core network 1 is an EPC network, the core network 2 may be a 5GC network. If the core network 1 is a 5GC network, the core network 2 may be an EPC network.

Figure 2:
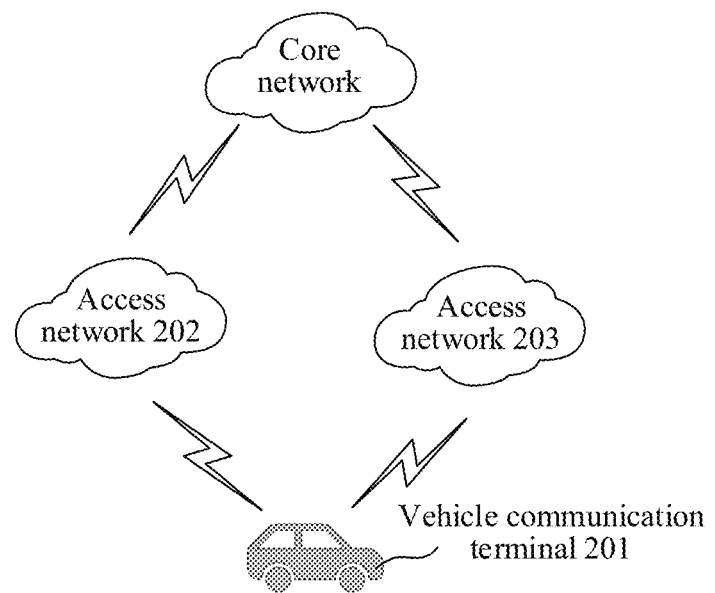
FIG. 2 is a schematic diagram of an example system architecture to which a communication method according to an example embodiment of the disclosure may be applied.

FIG. 2 is a schematic diagram of another example of a system architecture. The technical solutions provided by the embodiments of the disclosure may be applied to the system architecture of FIG. 2.

As shown in FIG. 2, the system architecture may include a vehicle communication terminal 201, an access network 202, an access network 203, and a core network connected to the access network 202 and the access network 203.

It is to be understood that, the quantity of the vehicle communication terminals 201 and the quantity of the networks shown in FIG. 2 are merely an example. The system architecture may include any quantity of vehicle communication terminals 201 and any quantity of networks depending on an embodiment.

The core network in the system architecture shown in FIG. 2 may be a 5GC network. The access network 202 and the access network 203 may be an E-UTRA network and a new radio (NR) network. For example, if the access network 202 is an E-UTRA network, the access network 203 may be an NR network. If the access network 202 is an NR network, the access network 203 may be an E-UTRA network.

Figure 3:
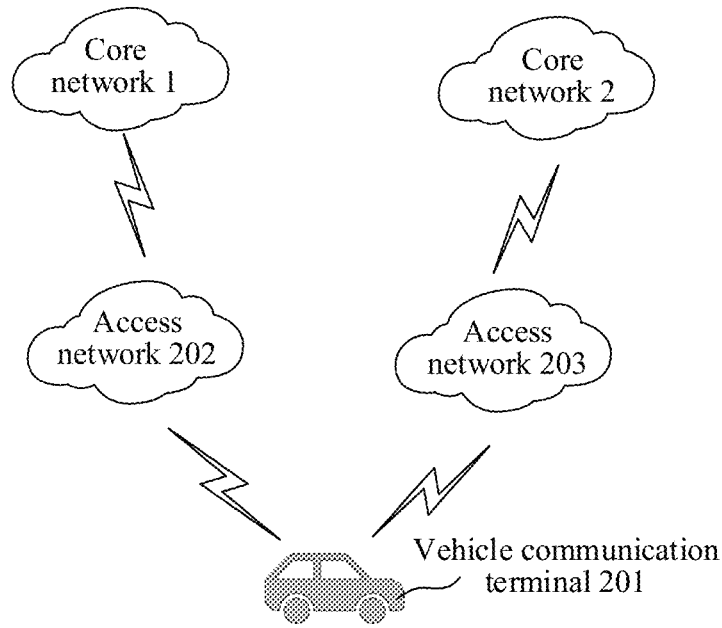
FIG. 3 is a schematic diagram of an example system architecture to which a communication method according to an example embodiment of the disclosure may be applied.

FIG. 3 shows a variant example of a system architecture based on FIG. 2. The core network connected to the access network 202 may be different from the core network connected to the access network 203. For example, the core network connected to the access network 202 is the core network 1, and the core network connected to the access network 203 is the core network 2.

The access network 202 and the access network 203 in the system architecture shown in FIG. 3 may be an E-UTRA network and an NR network. For example, if the access network 202 is an E-UTRA network, the access network 203 may be an NR network. If the access network 202 is an NR network, the access network 203 may be an E-UTRA network. If the access network 202 is an E-UTRA network and the access network 203 is an NR network, the core network 1 may be an EPC network, and the core network 2 may be a 5GC network. If the access network 202 is an NR network and the access network 203 is an E-UTRA network, the core network 1 may be a 5GC network, and the core network 2 may be an EPC network.

Based on the system architecture shown in FIG. 2 or FIG. 3, in an embodiment of the disclosure, when the vehicle communication terminal 201 is within the coverage of the access network 202, the access network 202 may determine whether inter-radio access technology-based communication resource control is allowed between an access network entity in the access network 202 and an access network entity in the access network 203. If the inter-radio access technology-based communication resource control is allowed between the access network entity in the access network 202 and the access network entity in the access network 203, when the vehicle communication terminal 201 moves from the coverage of the access network 202 to the coverage of the access network 203, the communication resource scheduling may continue to be performed for the vehicle communication terminal 201 by using the access network entity in the access network 202. It can be learned that, based on the system architecture shown in FIG. 2 or FIG. 3, the vehicle communication terminal 201 may perform communication by using a scheduling mode.

In an embodiment of the disclosure, based on the system architecture shown in FIG. 2 or FIG. 3, the vehicle communication terminal 201 may further obtain a communication resource based on a resource pool mode. Specifically, the vehicle communication terminal 201 may determine a supported network mode according to a communication capability of the vehicle communication terminal. If the vehicle communication terminal 201 supports only a network mode of the access network 202, when the vehicle communication terminal 201 moves to the coverage of the access network 203, communication may continue by using a communication resource pool allocated by a network entity in the access network 202. If the vehicle communication terminal 201 supports network modes of both the access network 202 and the access network 203, after the vehicle communication terminal 201 moves to the coverage of the access network 203, resource configuration information of the access network 202 is maintained, until a communication resource allocated by a network entity in the access network 203 is obtained. It can be learned that, based on the system architecture shown in FIG. 2 or FIG. 3, the vehicle communication terminal 201 may perform communication by using a resource pool mode.

The implementation details of the technical solution of this embodiment of the disclosure are described in detail in the following.

Figure 4:
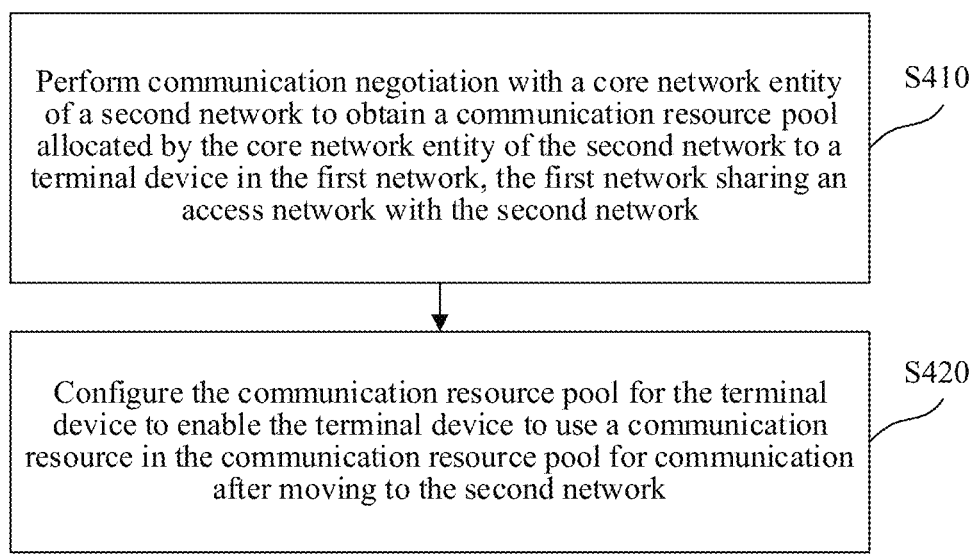
FIG. 4 is a schematic flowchart of a communication method according to an example embodiment of the disclosure.

FIG. 4 is a flowchart of a communication method according to an example embodiment of the disclosure. The communication method may be performed by a core network entity of a first network. Referring to FIG. 4, the communication method includes at least operation S410 and operation S420.

Operation S410: Perform communication negotiation with a core network entity of a second network to obtain a communication resource pool allocated by the core network entity of the second network to a terminal device in the first network, the first network sharing an access network with the second network.

In an embodiment of the disclosure, the core network entity of the first network may perform communication negotiation with core network entities of a plurality of second networks to respectively obtain communication resource pools allocated by the core network entities of the second networks to the terminal device. For example, the core network entity of the first network may first determine all of second networks existing around the first network, and then perform communication negotiation with core network entities of the second networks existing around to obtain communication resource pools allocated by the core network entities of the second networks to the terminal device.

In an embodiment of the disclosure, the core network entity of the first network may obtain a movement trajectory of the terminal device, then predict, according to the movement trajectory of the terminal device, a network corresponding to a location range to which the terminal device moves as a target second network, and further perform communication negotiation with a core network entity of the target second network to obtain a communication resource pool allocated by the core network entity of the target second network to the terminal device. For example, assuming that there are a second network 1, a second network 2, and a second network 3 around the first network, if the core network entity of the first network determines, according to the movement trajectory of the terminal device, that a location range to which the terminal device is to move corresponds to the second network 2, the second network 2 may be used as the target second network, and the core network entity of the first network may then perform communication negotiation with a core network entity of the second network 2 to obtain a communication resource pool allocated by the core network entity of the second network 2 to the terminal device. In this way, a quantity of times of communication between core network entities may be reduced, thereby improving the communication efficiency.

Still referring to FIG. 4. Operation S420: Configure the communication resource pool for the terminal device to enable the terminal device to use a communication resource in the communication resource pool for communication after moving to the second network.

In an embodiment of the disclosure, when the terminal device uses a communication resource in the communication resource pool for communication after moving to the second network, the terminal device may select a communication resource for data transmission from the communication resource pool.

The technical solution of the embodiment shown in FIG. 4 may be implemented based on the foregoing system architecture shown in FIG. 1. That is, the first network and the second network may have the same access network but different core networks. For example, if the first network is a 4G network, the core network of the first network is an EPC network, and the core network entity of the first network may be a control function (CF) entity. The second network may be a 5G network, the core network of the second network is a 5GC network, and the core network entity of the second network may be a policy control function (PCF) entity. Similarly, if the first network is a 5G network, the second network may be a 4G network. For example, the technical solution of the embodiment shown in FIG. 4 may be applied to a scenario in which a terminal device moves from an EPC network using E-UTRA to a 5GC network using E-UTRA, or may be applied to a scenario in which the terminal device moves from the 5GC network using E-UTRA to the EPC network using E-UTRA. The terminal device may be a vehicle to everything (V2X) terminal.

Figure 5:
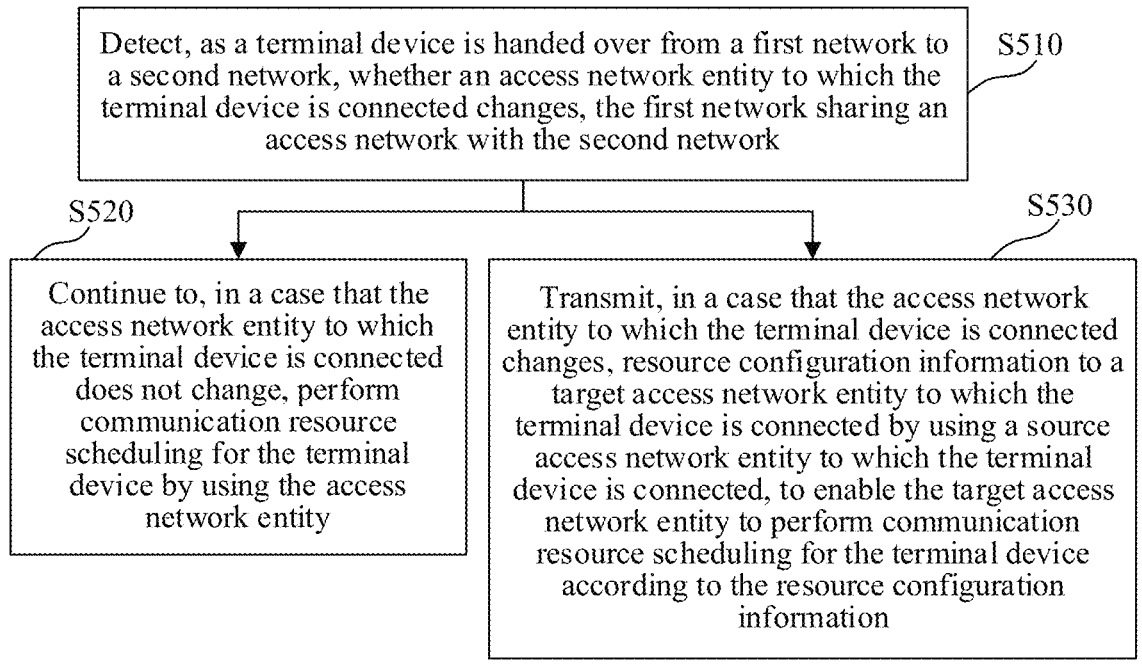
FIG. 5 is a schematic flowchart of a communication method according to an example embodiment of the disclosure.

FIG. 5 is a flowchart of another communication method according to an example embodiment of the disclosure. The communication method may be performed by an access network entity. For example, the access network entity may be an access network entity of a first network. Referring to FIG. 5, the communication method includes at least operation S510 to operation S530.

Operation S510: Detect, as a terminal device is handed over from a first network to a second network, whether an access network entity to which the terminal device is connected changes, the first network sharing an access network with the second network.

In an embodiment of the disclosure, if the first network shares an access network with the second network, the terminal device connected may be connected to the same access network entity or different access network entities as the terminal device is handed over from the first network to the second network.

Operation S520: When the access network entity to which the terminal device is connected does not change, continue to perform communication resource scheduling for the terminal device by using the access network entity (e.g., the access network entity of the first network).

In an embodiment of the disclosure, if the access network entity to which the terminal device is connected does not change as the terminal device is handed over from the first network to the second network, communication resource scheduling may continue to be performed for the terminal device by using the access network entity. That is, even if a core network may change, the terminal device may still be connected to the same access network entity (such as a base station).

Operation S530: When the access network entity to which the terminal device is connected changes, transmit resource configuration information to a target access network entity to which the terminal device is connected in the second network by using a source access network entity to which the terminal device is connected in the first network, to enable the target access network entity to perform communication resource scheduling for the terminal device according to the resource configuration information.

Herein, the source access network entity is an access network entity to which the terminal device is connected in the first network. The target access network entity is an access network entity to which the terminal device is connected after the terminal device is handed over from the first network to the second network.

In an embodiment of the disclosure, if the access network entity to which the terminal device is connected changes as the terminal device is handed over from the first network to the second network, because the first network shares an access network with the second network, both the first network and the second network support the same radio resource, and the resource configuration information may be further transmitted to the target access network entity by using the source access network entity, so that the target access network entity performs communication resource scheduling for the terminal device according to the resource configuration information. For example, if the access network shared by the first network and the second network is an E-UTRA network, both the first network and the second network support E-UTRA radio resources. Furthermore, the source access network entity (such as a base station) may transmit PC5 resource configuration information to the target access network entity as a handover context. If the target access network entity determines that continuous communication resource scheduling may be performed, the target access network entity may notify the terminal device, and then perform communication resource scheduling for the terminal device based on the PC5 resource configuration information.

The technical solution of the embodiment shown in FIG. 5 may be implemented based on the foregoing system architecture shown in FIG. 1. That is, the first network and the second network may have the same access network but different core networks. For example, if the first network is a 4G network, the second network may be a 5G network. If the first network is a 5G network, the second network may be a 4G network. The access networks of the first network and the second network may be E-UTRA networks, and access network entities of the first network and the second network may both be base stations. For example, the technical solution of the embodiment shown in FIG. 5 may be applied to a scenario in which a terminal device moves from an EPC network using E-UTRA to a 5GC network using E-UTRA, or may be applied to a scenario in which the terminal device moves from the 5GC network using E-UTRA to the EPC network using E-UTRA. The terminal device may be a V2X terminal.

Figure 6:
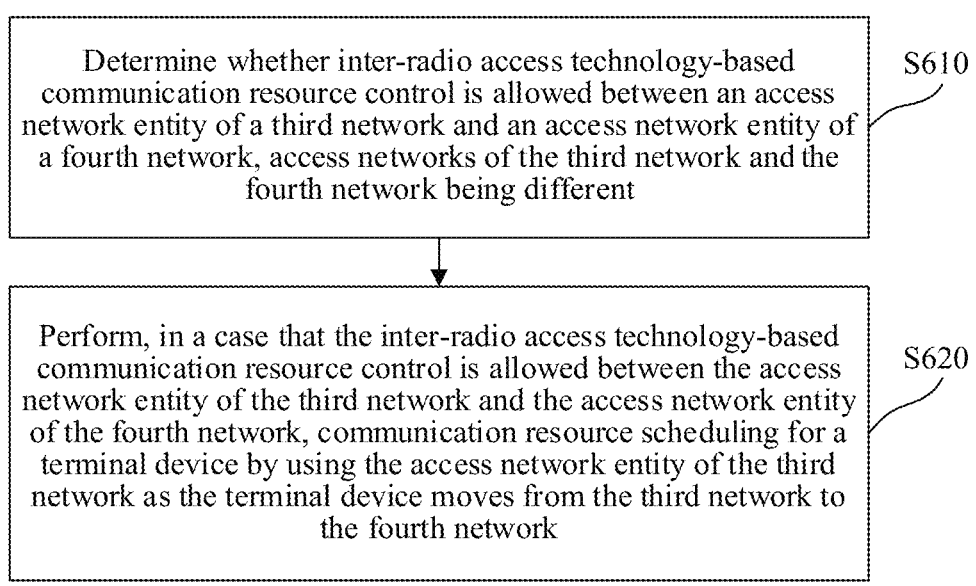
FIG. 6 is a schematic flowchart of a communication method according to an example embodiment of the disclosure.

FIG. 6 is a flowchart of another communication method according to an example embodiment of the disclosure. The communication method may be performed by an access network entity. For example, the access network entity may be an access network entity of a third network. Referring to FIG. 6, the communication method includes at least operation S610 and operation S620.

Operation S610: Determine whether inter-radio access technology-based communication resource control is allowed between an access network entity of a third network and an access network entity of a fourth network, access networks of the third network and the fourth network being different.

In an embodiment of the disclosure, when the access networks of the third network and the fourth network are different, core networks of the third network and the fourth network may be the same or different. For example, the third network and the fourth network may be respectively an EPC network using E-UTRA and a 5GC network using NR, or may be respectively a 5GC network using E-UTRA and a 5GC network using NR.

In an embodiment of the disclosure, communication negotiation may be performed with the access network entity of the fourth network by using the access network entity of the third network, to determine whether the inter-radio access technology-based communication resource control is allowed between the access network entity of the third network and the access network entity of the fourth network.

In an embodiment of the disclosure, communication negotiation may be alternatively performed with a core network entity of the fourth network by using a core network entity of the third network, to determine whether the inter-radio access technology-based communication resource control is allowed between the access network entity of the third network and the access network entity of the fourth network.

Operation S620: When the inter-radio access technology-based communication resource control is allowed between the access network entity of the third network and the access network entity of the fourth network, perform communication resource scheduling for a terminal device by using the access network entity of the third network as the terminal device moves from the third network to the fourth network.

In an embodiment of the disclosure, before the communication resource scheduling is performed for the terminal device by using the access network entity of the third network, a communication resource configured by the access network entity of the fourth network may further be obtained. For example, the access network entity of the third network negotiates with the access network entity of the fourth network in advance, to obtain the communication resource configured by the access network entity of the fourth network. Furthermore, when the access network entity of the third network performs the communication resource scheduling for the terminal device, the access network entity of the third network may schedule the terminal device to use the communication resource configured by the access network entity of the fourth network for communication.

In an embodiment of the disclosure, after the communication resource scheduling is performed for the terminal device by using the access network entity of the third network, a handover instruction may further be transmitted to the access network entity of the fourth network to enable the access network entity of the fourth network to perform the communication resource scheduling for the terminal device after the terminal device accesses the access network entity of the fourth network.

In an embodiment of the disclosure, if the inter-radio access technology-based communication resource control is not allowed between the access network entity of the third network and the access network entity of the fourth network, the terminal device may be controlled to release a communication resource of the third network as the terminal device moves from the third network to the fourth network and receive a communication resource allocated by the access network entity of the fourth network to the terminal device.

The technical solution of the embodiment shown in FIG. 6 may be implemented based on the foregoing system architecture shown in FIG. 2 or FIG. 3. That is, the third network and the fourth network may have the same access network but may have the same core network or different core networks. For example, the technical solution of the embodiment shown in FIG. 6 may be applied to a scenario in which a terminal device moves from an EPC network using E-UTRA to a 5GC network using NR, or may be applied to a scenario in which the terminal device moves from a 5GC network using E-UTRA to a 5GC network using NR, or may be applied to a scenario in which the terminal device moves from a 5GC network using NR to an EPC network using E-UTRA, or may be applied to a scenario in which the terminal device moves from a 5GC network using NR to a 5GC network using E-UTRA. The terminal device may be a V2X terminal.

Figure 7:
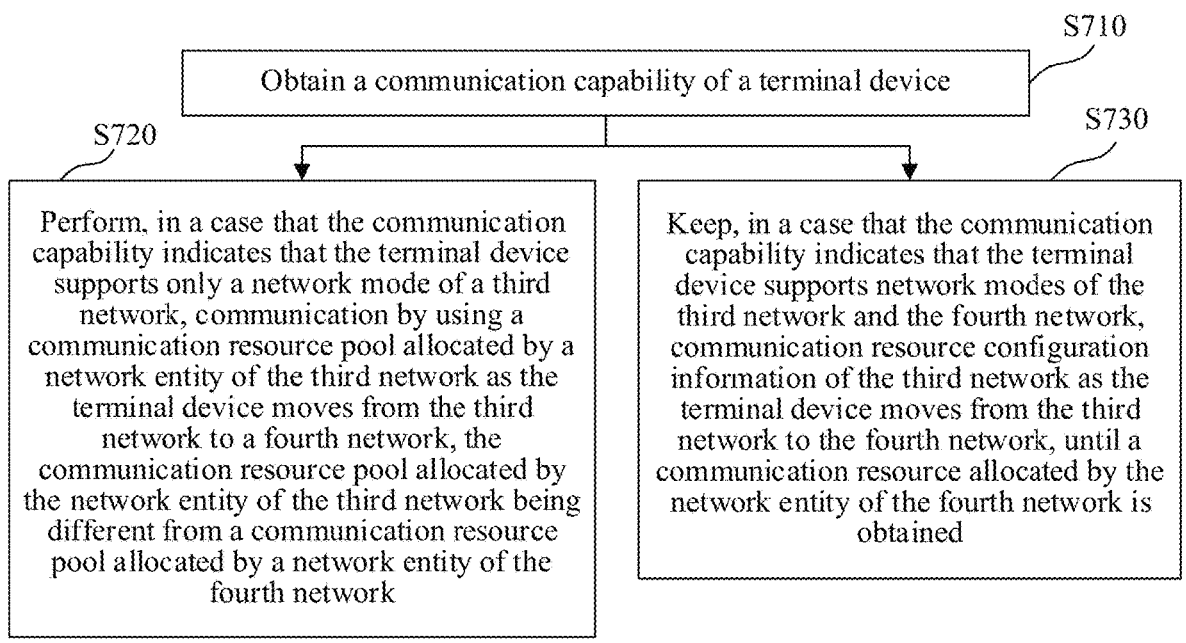
FIG. 7 is a schematic flowchart of a communication method according to an example embodiment of the disclosure.

FIG. 7 is a flowchart of another communication method according to an example embodiment of the disclosure. The communication method may be performed by a terminal device. Referring to FIG. 7, the communication method includes at least operation S710 to operation S730.

Operation S710: Obtain a communication capability of a terminal device.

In an embodiment of the disclosure, the communication capability of the terminal device may indicate whether the terminal device is a single-mode terminal or a dual-mode terminal. That is, the communication capability of the terminal device is used for indicating whether the terminal device may support network modes of both a third network and a fourth network.

Operation S720: When the communication capability indicates that the terminal device supports only a network mode of a third network, perform communication by using a communication resource pool allocated by a network entity of the third network as the terminal device moves from the third network to the fourth network, the communication resource pool allocated by the network entity of the third network being different from a communication resource pool allocated by a network entity of the fourth network.

In an embodiment of the disclosure, if the terminal device supports only the network mode of the third network, communication is performed by using the communication resource pool allocated by the network entity of the third network as the terminal device moves from the third network to the fourth network. In this manner, the communication continuity of the terminal device may be ensured, while coexistence of terminal devices of different network modes in the same network may also be implemented.

Operation S730: When the communication capability indicates that the terminal device supports network modes of the third network and the fourth network, maintain communication resource configuration information of the third network as the terminal device moves from the third network to the fourth network, until a communication resource allocated by the network entity of the fourth network is obtained.

In an embodiment of the disclosure, the communication resource that is obtained by the terminal device and allocated by the network entity of the fourth network may be dynamically allocated by the network entity of the fourth network or may be pre-configured. The network entity of the fourth network may be an access network entity or a core network entity.

The technical solution of the embodiment shown in FIG. 7 may be implemented based on the foregoing system architecture shown in FIG. 2 or FIG. 3. That is, the third network and the fourth network may have the same access network but may have the same core network or different core networks. Specifically, the technical solution of the embodiment shown in FIG. 7 may be applied to a scenario in which a terminal device moves from an EPC network using E-UTRA to a 5GC network using NR, or may be applied to a scenario in which the terminal device moves from a 5GC network using E-UTRA to a 5GC network using NR, or may be applied to a scenario in which the terminal device moves from a 5GC network using NR to an EPC network using E-UTRA, or may be applied to a scenario in which the terminal device moves from a 5GC network using NR to a 5GC network using E-UTRA. The terminal device may be a V2X terminal.

The following describes apparatus embodiments of the disclosure, and the apparatus embodiments may be used for performing the communication methods in one or more of the foregoing embodiments of the disclosure. For details not disclosed in the apparatus embodiments of the disclosure, reference may be made to the foregoing communication method embodiments of the disclosure.

Figure 8:
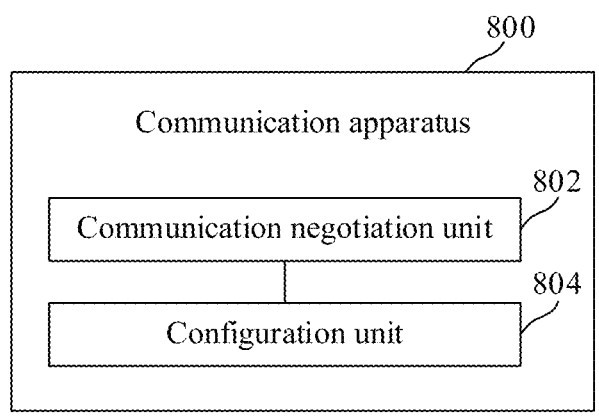
FIG. 8 is a structural diagram of a communication apparatus according to an example embodiment of the disclosure.

FIG. 8 is a structural diagram of a communication apparatus according to an example embodiment of the disclosure.

Referring to FIG. 8, a communication apparatus 800 according to an example embodiment of the disclosure includes a communication negotiation unit 802 and a configuration unit 804.

The communication negotiation unit 802 is configured to perform communication negotiation with a core network entity of a second network to obtain a communication resource pool allocated by the core network entity of the second network to a terminal device in a first network, the first network sharing an access network with the second network.

The configuration unit 804 is configured to configure the communication resource pool for the terminal device to enable the terminal device to use a communication resource in the communication resource pool for communication after moving to the second network.

In some embodiments of the disclosure, the communication negotiation unit 802 is configured to:

perform communication negotiation with core network entities of a plurality of second networks to respectively obtain communication resource pools allocated by the core network entities of the second networks to the terminal device.

In some embodiments of the disclosure, the communication negotiation unit 802 is configured to:

obtain a movement trajectory of the terminal device;

predict, according to the movement trajectory of the terminal device, a network corresponding to a location range to which the terminal device moves as a target second network; and perform communication negotiation with a core network entity of the target second network to obtain a communication resource pool allocated by the core network entity of the target second network to the terminal device.

In some embodiments of the disclosure, based on the foregoing solutions, the first network and the second network include an EPC network and a 5GC network that share an access network.

Figure 9:
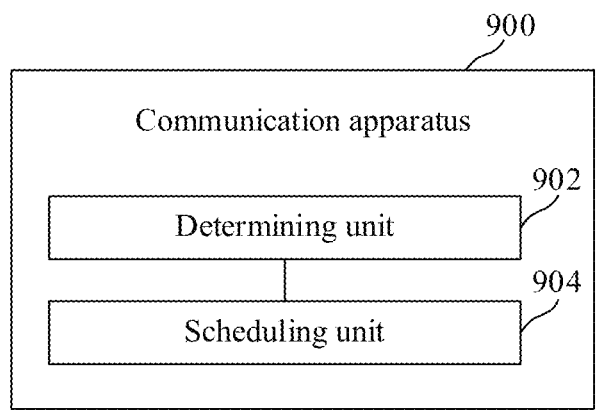
FIG. 9 is a structural diagram of a communication apparatus according to an example embodiment of the disclosure.

FIG. 9 is a structural diagram of another communication apparatus according to an example embodiment of the disclosure.

Referring to FIG. 9, a communication apparatus 900 according to an example embodiment of the disclosure includes a determining unit 902 and a scheduling unit 904.

The determining unit 902 is configured to determine whether inter-radio access technology-based communication resource control is allowed between an access network entity of a third network and an access network entity of a fourth network, access networks of the third network and the fourth network being different.

The scheduling unit 904 is configured to, when the inter-radio access technology-based communication resource control is allowed between the access network entity of the third network and the access network entity of the fourth network, perform communication resource scheduling for a terminal device by using the access network entity of the third network as the terminal device moves from the third network to the fourth network.

In some embodiments of the disclosure, the scheduling unit 904 is further configured to:

when the inter-radio access technology-based communication resource control is not allowed between the access network entity of the third network and the access network entity of the fourth network, control the terminal device to release a communication resource of the third network as the terminal device moves from the third network to the fourth network and receive a communication resource allocated by the access network entity of the fourth network to the terminal device.

In some embodiments of the disclosure, the communication apparatus 900 further includes:

an obtaining unit, configured to obtain, before the communication resource scheduling is performed for the terminal device by using the access network entity of the third network, a communication resource configured by the access network entity of the fourth network; and a process in which the scheduling unit 904 performs the communication resource scheduling for the terminal device by using the access network entity of the third network includes:

scheduling, by using the access network entity of the third network, the terminal device to use the communication resource configured by the access network entity of the fourth network for communication.

In some embodiments of the disclosure, the communication apparatus 900 further includes:

a transmission unit, configured to, after the communication resource scheduling is performed for the terminal device by using the access network entity of the third network, transmit a handover instruction to the access network entity of the fourth network to enable the access network entity of the fourth network to perform the communication resource scheduling for the terminal device after the terminal device accesses the access network entity of the fourth network.

In some embodiments of the disclosure, the determining unit 902 is configured to:

perform communication negotiation with the access network entity of the fourth network by using the access network entity of the third network, to determine whether the inter-radio access technology-based communication resource control is allowed between the access network entity of the third network and the access network entity of the fourth network; or perform communication negotiation with a core network entity of the fourth network by using a core network entity of the third network, to determine whether the inter-radio access technology-based communication resource control is allowed between the access network entity of the third network and the access network entity of the fourth network.

In some embodiments of the disclosure, the third network and the fourth network include an EPC network and a 5GC network that have different access networks, or the third network and the fourth network include 5GC networks having different access networks.

Figure 10:
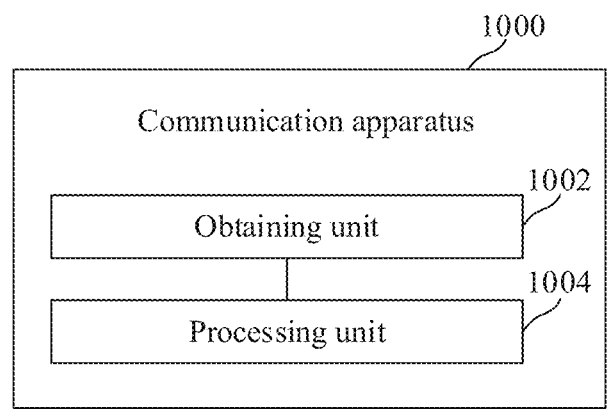
FIG. 10 is a structural diagram of a communication apparatus according to an example embodiment of the disclosure.

FIG. 10 is a structural diagram of another communication apparatus according to an example embodiment of the disclosure.

Referring to FIG. 10, a communication apparatus 1000 according to an example embodiment of the disclosure includes an obtaining unit 1002 and a processing unit 1004.

The obtaining unit 1002 is configured to obtain a communication capability of a terminal device.

The processing unit 1004 is configured to, when the communication capability indicates that the terminal device supports only a network mode of a third network, perform communication by using a communication resource pool allocated by a network entity of the third network as the terminal device moves from the third network to a fourth network, the communication resource pool allocated by the network entity of the third network being different from a communication resource pool allocated by a network entity of the fourth network; and when the communication capability indicates that the terminal device supports network modes of the third network and the fourth network, maintain communication resource configuration information of the third network as the terminal device moves from the third network to the fourth network, until a communication resource allocated by the network entity of the fourth network is obtained.

Figure 11:
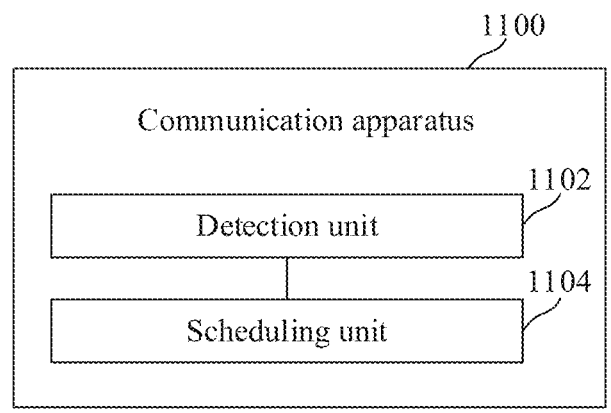
FIG. 11 is a structural diagram of a communication apparatus according to an example embodiment of the disclosure.

FIG. 11 is a structural diagram of another communication apparatus according to an example embodiment of the disclosure.

Referring to FIG. 11, a communication apparatus 1100 according to an example embodiment of the disclosure includes a detection unit 1102 and a scheduling unit 1104.

The detection unit 1102 is configured to detect, as a terminal device is handed over from a first network to a second network, whether an access network entity to which the terminal device is connected changes, the first network sharing an access network with the second network.

The scheduling unit 1104 is configured to: when the access network entity to which the terminal device is connected does not change, continue to perform communication resource scheduling for the terminal device by using the access network entity; and when the access network entity to which the terminal device is connected changes, transmit resource configuration information to a target access network entity to which the terminal device is connected in the second network by using a source access network entity to which the terminal device is connected in the first network, to enable the target access network entity to perform communication resource scheduling for the terminal device according to the resource configuration information, the source access network entity being an access network entity to which the terminal device is connected in the first network, the target access network entity being an access network entity to which the terminal device is connected in the second network.

Figure 12:
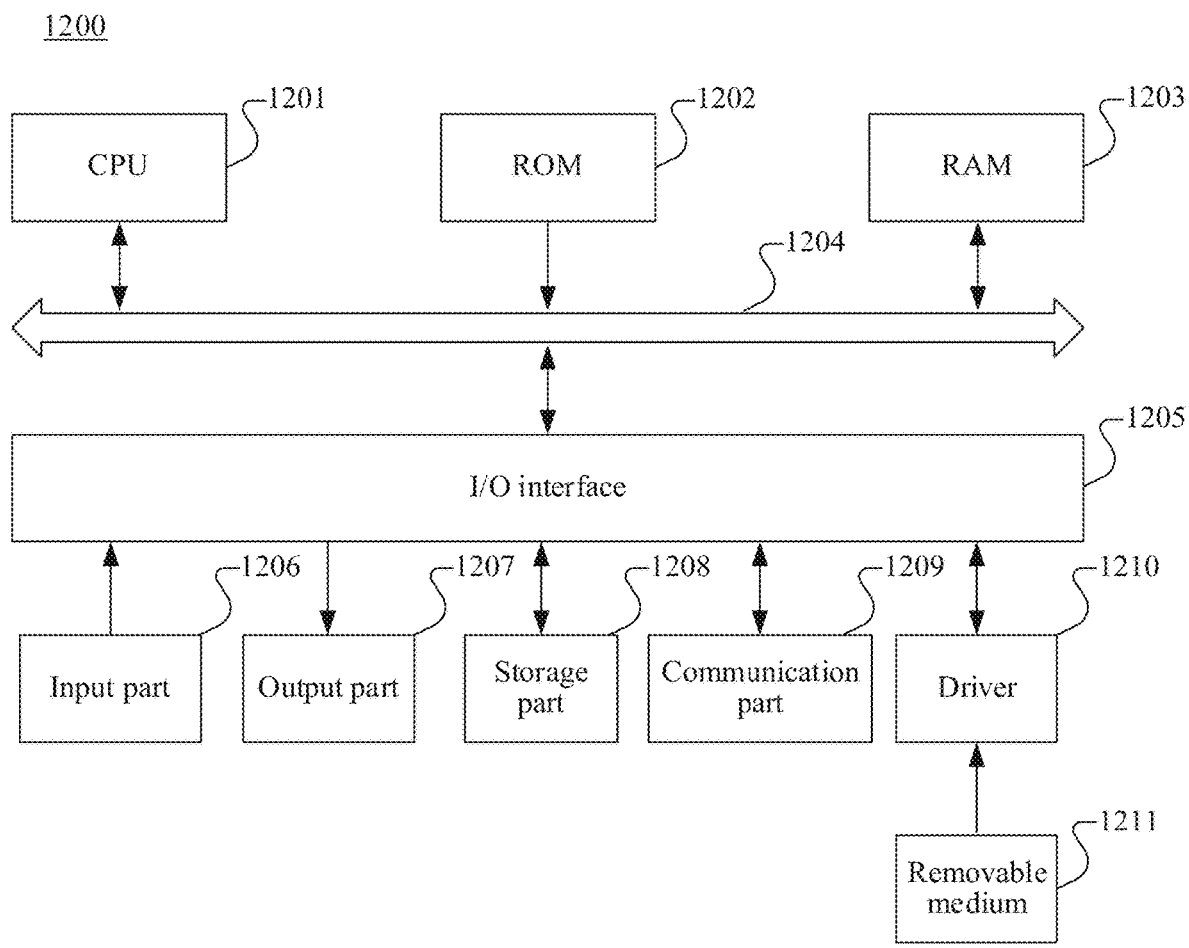
FIG. 12 is a schematic structural diagram of a computer system of an electronic device adapted to implement an example embodiment of the disclosure.

FIG. 12 is a schematic structural diagram of a computer system of an electronic device adapted to implement an embodiment of the disclosure.

A computer system 1200 of the electronic device shown in FIG. 12 is merely an example, and does not constitute any limitation on functions and use ranges of the embodiments of the disclosure.

As shown in FIG. 12, the computer system 1200 includes a central processing unit (CPU) 1201, which may perform various suitable actions and processing based on a program stored in a read-only memory (ROM) 1202 or a program loaded from a storage part 1208 into a random access memory (RAM) 1203, for example, perform the method described in any one of the foregoing embodiments. The RAM 1203 further stores various programs and data used for system operations. The CPU 1201, the ROM 1202, and the RAM 1203 are connected to each other through a bus 1204. An input/output (I/O) interface 1205 is also connected to the bus 1204.

The following components are connected to the I/O interface 1205: an input part 1206 including a keyboard, a mouse, or the like; an output part 1207 including a cathode ray tube (CRT), a liquid crystal display (LCD), a speaker, or the like; the storage part 1208 including a hard disk, or the like; and a communication part 1209 including a network interface card such as a local area network (LAN) card or a modem. The communication part 1209 performs communication processing through a network such as the Internet. A driver 1210 is also connected to the I/O interface 1205 as needed. A removable medium 1211 such as a magnetic disk, an optical disc, a magneto-optical disk, or a semiconductor memory is installed on the drive 1210 as needed, so that a computer program read from the removable medium is installed into the storage part 1208 as needed.

Particularly, according to an example embodiment of the disclosure, the processes described by referring to the flowcharts may be implemented as computer software programs. For example, an embodiment of the disclosure includes a computer program product. The computer program product includes a computer program stored in a computer-readable medium. The computer program includes a computer program used for performing a method shown in the flowchart. In such an embodiment, the computer program may be downloaded and installed from a network through the communication part 1209, and/or installed from the removable medium 1211. When the computer program is executed by the CPU 1201, the various functions defined in the system of the disclosure are executed.

The computer-readable medium shown in the embodiments of the disclosure may be a computer-readable signal medium or a computer-readable storage medium or any combination the two. The computer-readable storage medium may be, for example, but is not limited to, an electrical, magnetic, optical, electromagnetic, infrared, or semiconductor system, apparatus, or device, or any combination thereof. An example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disk read-only memory (CD-ROM), an optical storage device, a magnetic storage device, or any appropriate combination thereof. In the disclosure, the computer-readable storage medium may include any tangible medium containing or storing a program, and the program may be used by or used in combination with an instruction execution system, an apparatus, or a device. In the disclosure, the computer-readable signal medium may include a data signal transmitted in a baseband or as part of a carrier, and stores a computer-readable computer program. A data signal propagated in such a way may be in a plurality of forms, including, but not limited to, an electromagnetic signal, an optical signal, or any appropriate combination thereof. The computer-readable signal medium may be further any computer-readable medium in addition to the computer-readable storage medium. The computer-readable medium may send, propagate, or transmit a program configured to be used by or in combination with an instruction execution system, an apparatus, or a device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions and operations that may be implemented by a system, a method, and a computer program product according to various embodiments of the disclosure. Each box in a flowchart or a block diagram may represent a module, a program segment, or a part of code. The module, the program segment, or the part of code includes one or more executable instructions used for implementing specified logic functions. In some embodiments, functions annotated in boxes may alternatively occur in a sequence different from that annotated in an accompanying drawing. For example, functions annotated in two boxes shown in succession in the flowchart may be performed in parallel, or may be performed in a reverse sequence. This may be freely determined by using a related function. Each box in a block diagram or a flowchart and a combination of boxes in the block diagram or the flowchart may be implemented by using a dedicated hardware-based system configured to perform a designated function or operation, or may be implemented by using a combination of dedicated hardware and a computer instruction.

A unit described in the embodiments of the disclosure may be implemented in a software manner, or may be implemented in a hardware manner, and the unit described may also be set in a processor. Names of these units do not constitute a limitation on the units in a case.

According to another aspect, the disclosure further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. According to the implementations of the disclosure, the features and functions of two or more modules or units described above may be specifically implemented in one module or unit. Conversely, features and functions of one module or unit described above may be further divided into a plurality of modules or units for implementation.

Through the descriptions of the foregoing implementations, a person skilled in the art easily understands that the example implementations described herein may be implemented through software, or may be implemented through software located in combination with corresponding hardware. Therefore, the technical solutions of the embodiments of the disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of the disclosure.

In the technical solutions provided by some embodiments of the disclosure, the core network entity of the first network obtains, by performing communication negotiation with the core network entity of the second network that shares an access network with the first network, the communication resource pool allocated by the core network entity of the second network to the terminal device in the first network, and further configures, for the terminal device, the communication resource pool allocated by the core network entity of the second network, so as to allocate the communication resource pool to the terminal device in advance before the terminal device moves to the second network. Accordingly, the terminal device may directly use the communication resource in the communication resource pool for communication after moving to the second network. Thus, the communication continuity during network handover of the terminal device may be ensured, which is conducive to improving the communication efficiency of the terminal device.

In the technical solutions provided by some embodiments of the disclosure, when the inter-radio access technology-based communication resource control is allowed between the access network entity of the third network and the access network entity of the fourth network that has a different access network from the third network, the communication resource scheduling is performed for the terminal device by using the access network entity of the third network as the terminal device moves from the third network to the fourth network. Therefore, the communication continuity may be ensured during network handover of the terminal device when the inter-radio access technology-based communication resource control is supported on a network side, which is conducive to improving the communication efficiency of the terminal device.

In the technical solutions provided by some embodiments of the disclosure, the communication capability of the terminal device is obtained and, when the terminal device supports only the network mode of the third network, communication is performed by using the communication resource pool allocated by the network entity of the third network as the terminal device moves from the third network to the fourth network. Accordingly, the terminal device may perform communication by using a communication resource pool of an original network during network handover of the terminal device, thereby ensuring the communication continuity of the terminal device, and also implementing coexistence of terminal devices of different network modes in the same network. In addition, when the terminal device supports network modes of the third network and the fourth network, communication resource configuration information of the third network is maintained as the terminal device moves from the third network to the fourth network, until a communication resource allocated by the network entity of the fourth network is obtained. In this way, the communication continuity of the terminal device may also be ensured during the network handover of the terminal device, which is conducive to improving the communication efficiency of the terminal device.

In technical solutions provided by some embodiments of the disclosure, when the access network entity to which the terminal device is connected does not change as the terminal device is handed over from the first network to the second network that shares an access network with the first network, communication resource scheduling continues to be performed for the terminal device by using the access network entity to which the terminal device is connected. Accordingly, resource scheduling may be performed for the terminal device during network handover by using the same access network entity, thereby ensuring the communication continuity of the terminal device. In addition, when the access network entity to which the terminal device is connected changes, the communication resource configuration information is transmitted to the target access network entity to which the terminal device is connected in the second network by using the source access network entity to which the terminal device is connected in the first network, so that the communication resource scheduling may be performed for the terminal device by using the target access network entity, and the communication continuity during network handover may also be implemented.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

After considering the specification and practicing the implementations of the disclosure, a person skilled in the art may easily conceive of other implementations of the disclosure. The disclosure is intended to cover any variations, uses, or adaptive changes of the disclosure. These variations, uses, or adaptive changes follow the general principles of the disclosure and include common general knowledge or common technical means in the art, which are not disclosed in the disclosure.

The foregoing descriptions are merely example embodiments of disclosure, and are not intended to limit the embodiments of the disclosure. Any modification, equivalent replacement, or improvement made within the spirit and principle of the embodiments of the disclosure shall fall within the protection scope of the disclosure.

What is claimed is:

1. A communication method, performed by a core network entity of a first network, the method comprising:
    performing communication negotiation with a core network entity of a second network to obtain a communication resource pool allocated by the core network entity of the second network to a terminal device in the first network, the first network sharing an access network with the second network; and
    configuring the communication resource pool for the terminal device to enable the terminal device to use a communication resource in the communication resource pool for communication after moving to the second network,
    wherein the communication resource pool comprises respective communication resources pools allocated corresponding to a plurality of second networks, or a communication resource pool allocated corresponding to a second network that is selected among the plurality of second networks based on a movement trajectory of the terminal device.

2. The communication method according to claim 1, wherein the performing the communication negotiation comprises:
    performing communication negotiation with core network entities of the plurality of second networks to obtain the respective communication resource pools allocated by the core network entities of the plurality of second networks to the terminal device.

3. The communication method according to claim 1, wherein the performing the communication negotiation comprises:
    obtaining the movement trajectory of the terminal device;
    predicting, according to the movement trajectory of the terminal device, a network corresponding to a location range to which the terminal device moves as a target second network; and
    performing communication negotiation with a core network entity of the target second network to obtain a communication resource pool allocated by the core network entity of the target second network to the terminal device.

4. The communication method according to claim 1, wherein the first network and the second network comprise an evolved packet core (EPC) network and a 5G core (5GC) network that share an access network.

5. A non-transitory computer-readable medium, storing a computer program, the computer program being executable by at least one processor to cause the at least one processor to perform the communication method according to claim 1.

6. An electronic device, comprising:
    at least one memory configured to store program code; and
    at least one processor configured to read the program code and operate as instructed by the program code to perform the communication method according to claim 1.

* * * * *